US005326068A

United States Patent [19]

Spears

[11] Patent Number: 5,326,068

[45] Date of Patent: Jul. 5, 1994

[54] SCREW AND NUT HOLDER FOR TOOL

[76] Inventor: James M. Spears, 205 Newbridge St., Menlo Park, Calif. 94025

[21] Appl. No.: 396,491

[22] Filed: Aug. 21, 1989

[51] Int. Cl.[5] .................... F16M 13/00

[52] U.S. Cl. .................... 248/682; 248/229; 211/60.1; 211/69

[58] Field of Search .................... 248/229, 682, 688, 230; 211/89, 107, 60.1, 70.6, 70, 69

[56] References Cited

U.S. PATENT DOCUMENTS

| | | | |
|---|---|---|---|
| 816,959 | 4/1906 | Briganti | 211/69 X |
| 1,221,517 | 4/1917 | Dunbar | 211/70 |
| 1,257,107 | 1/1918 | Patterson | 211/107 X |
| 2,017,088 | 10/1935 | Bihler | 211/70 |
| 2,797,851 | 7/1957 | Leake | 224/42.45 R |
| 2,824,651 | 2/1958 | Davis | 211/69 |
| 2,874,267 | 2/1959 | Shipley | 248/682 X |
| 3,116,730 | 1/1964 | Tingley | 211/70 X |
| 3,472,389 | 10/1969 | Lowe | 211/70 |
| 4,501,201 | 2/1985 | Fitzner et al. | 211/107 X |

*Primary Examiner*—Alvin C. Chin-Shue
*Attorney, Agent, or Firm*—Townsend and Townsend Khourie and Crew

[57] ABSTRACT

A holder for fastener parts which can be removably attached to a tool, such as a wrench or screwdriver. The holder has openings therein which allow the holder to frictionally hold a number of the fastener parts, such as screws, nuts, bolts, washers and the like, so as to have such fastener parts attached to the tool. In this way, the fastener parts are readily accessible to a person using the tool yet the tool can be used without being interfered with by the holder or the fastener parts.

Any one of a number of embodiments of the holder of the present invention can be provided, depending upon the size of the tool to be used with the holder and depending upon the number of items to be held by the holder itself.

1 Claim, 1 Drawing Sheet

SCREW AND NUT HOLDER FOR TOOL

FIELD OF THE INVENTION

This invention relates to improvements in the holding of nuts, bolts, screws, washers and the like and, more particularly, to such a holder for removable attachment to a tool, such as a screwdriver or a wrench.

BACKGROUND OF THE INVENTION

When working with mechanical parts which need to be connected together by fastener parts, such as screws, bolts, nuts and washers, it is a tedious job to hold the fastener parts in one hand while handling a tool in the other. This is especially a problem when one is working with overhead structures or in cramped spaces where it is difficult to simultaneously hold the screws in one hand while manipulating the tool in the opposite hand.

Because of these problems, a need has existed for some time for a means to hold a plurality of screws, nuts, bolts and washers while a tool is being used in such a way that these items will be readily accessible yet do not interfere with the use of the tool. The present invention satisfies this need.

SUMMARY OF THE INVENTION

The present invention provides a holder which can be removably attached to a tool, such as a wrench or screwdriver, and the holder has openings therein which allow the holder to frictionally hold a number of fastener parts, such as screws, nuts, bolts, washers and the like so as to have such fastener parts attached to the tool. In this way, the fastener parts are readily accessible to a person using the tool yet the tool, such as a screwdriver or wrench can be used without being interfered with by the holder or the fastener parts.

The primary object of the present invention is to provide a holder for a tool wherein the holder has openings therethrough for holding fastener parts, such as screws, nuts, bolts, washers and the like so that such fastener parts can be conveniently held in place until ready for use and while the tool is being used yet the holder permits the fastener parts to be easily placed on and taken off the holder.

Other objects of this invention will become apparent as the following specification progresses, reference being had to the accompanying drawings for an illustration of the invention.

DETAILED DESCRIPTION OF THE DRAWINGS

Figure 1:
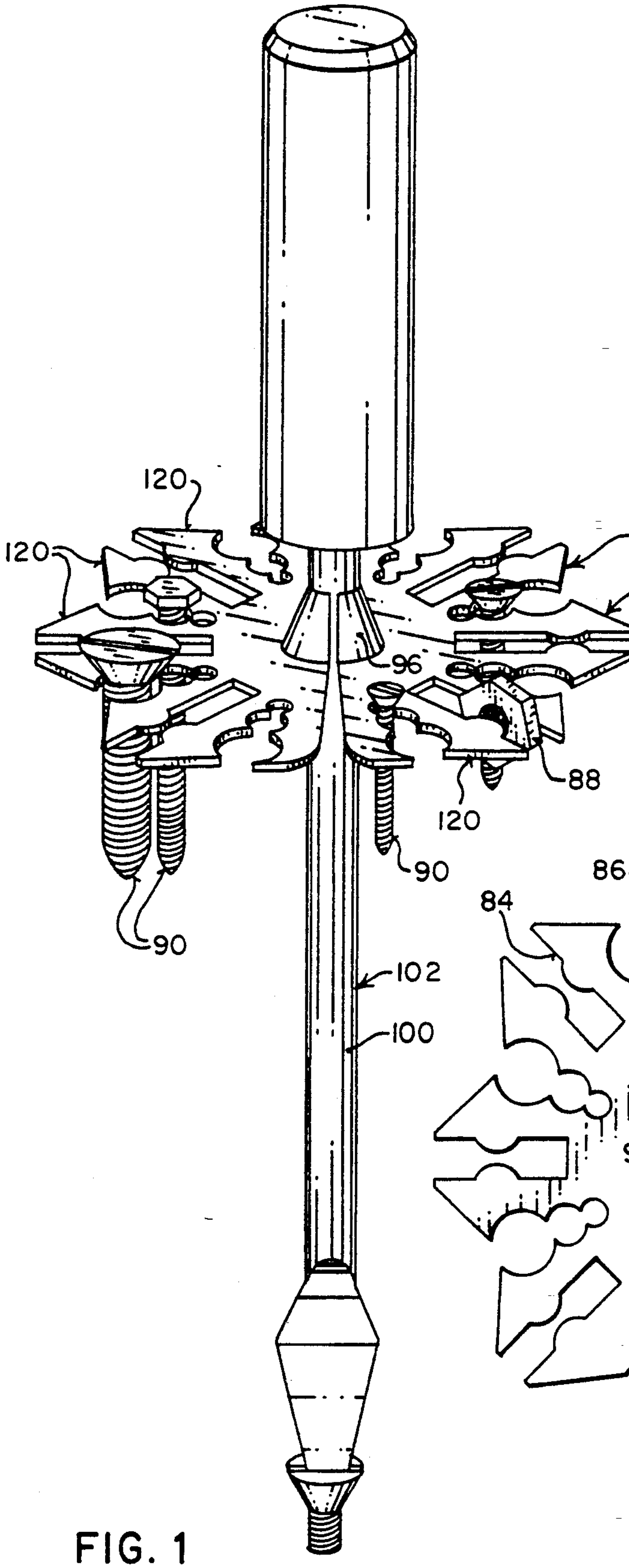
FIG. 1 is a view of a holder of the present invention mounted on a screwdriver.
Figure 2:
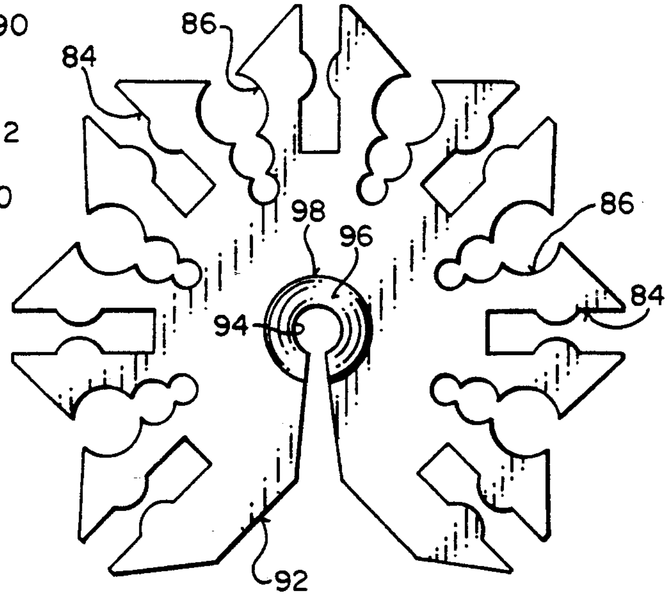
FIG. 2 is a top plan view of the holder of FIG. 1.

A holder of the present invention is broadly denoted by the numeral 80 and is shown in FIGS. 1 and 2. Holder 80 includes a platelike resilient body 82 having two different types of holes or slots therethrough, namely slots 84 and slots 86. Slots 84 are adapted to receive and hold nuts 88 while slots 86 are adapted to be used to hold screws or bolts 90 as shown in FIG. 1. Body 82 has a pair of edges 121 extending outwardly from the end of each slot 86, respectively for guiding screws and bolts into the slot. The pair of edges of each slot 84 substantially converge to each other as the outer periphery of body 82 is approached, as shown in FIGS. 1 and 2.

Body 82 has a slot 92 which extends inwardly from the outer periphery of the body and terminates at a hole 94 surrounded by a flange 96 projecting upwardly from the upper surface 98 of body 82 and a flange (not shown) projecting downwardly from the bottom surface of body 82. Flanges 96 stabilize the body 82 while the body is on shank 100 of a tool 102, such as a screwdriver.

Body 82 is of a suitable resilient material, such as rubber or plastic, a suitable plastic being polyurethane. Body 82 can be made from a molding process to minimize production costs. Slots 84 and 86 provide for different sized screws and nuts to be held by body 82. The different sizes of the slots allows fastener parts to be attached and detached with minimum effort.

What is claimed is:

1. A tool having a rigid shank with one end of the shank having means for engaging a workpiece; and a yieldable plastic body of one-piece construction and having an outer periphery and a number of slots extending into the body from said outer periphery, first slots releasably holding nuts and second slots holding screws, each slot having an open outer end to allow fastener parts to be inserted into and to be taken out of the slot, said body having projections extending into the slots for changing the width of the slots, at least a pair of said projections presenting means inserted into the hole of a nut to hold the nut in the slot, each of said slots having a radial length sufficient for receiving a number of fastener parts to be frictionally held in the slots of the body, said body having a central hole which mounts the body on said shank of the tool, as tubular flange surrounding the central hole, there being a slit extending between the outer periphery and the hole and through one side of the flange for allowing the shank of the tool to be directed through said slit, into the hole, and into frictional engagement with the inner peripheral surface of said flange, said body being positionable along the shank with the body in the line of sight of the user, whereby fastener parts held by the body can be carried by the tool, said body having a pair of edges extending outwardly from the end of each second slot, respectively, for guiding screws into the slot, each pair of edges being convergent to each other as the body is approached.

* * * * *